United States Patent [19]

Locatell, Jr.

[11] 4,021,416

[45] May 3, 1977

[54] THIOL POLYMERS

[75] Inventor: Louis Locatell, Jr., Wellesley Hills, Mass.

[73] Assignee: Polaroid Corporation, Cambridge, Mass.

[22] Filed: May 5, 1975

[21] Appl. No.: 574,295

[52] U.S. Cl. ............................................ 260/79.7
[51] Int. Cl.² ........................................ C08 128/02
[58] Field of Search ............ 260/79.7, 577; 96/114, 96/29 R, 76 R

[56] References Cited

UNITED STATES PATENTS

| | | | |
|---|---|---|---|
| 2,749,331 | 6/1956 | Breslow | 260/79.7 |
| 2,906,716 | 9/1959 | Hwa | 260/79.7 |
| 3,221,013 | 11/1965 | Fields et al. | 260/577 |
| 3,919,277 | 11/1975 | Luhowy et al. | 260/430 |

Primary Examiner—V. P. Hoke
Attorney, Agent, or Firm—Sybil A. Campbell

[57] ABSTRACT

This invention relates to styrene polymers containing pendant aminoethanethiol moieties which are useful as complexing agents for silver ions and/or soluble silver complex in photography.

5 Claims, No Drawings

THIOL POLYMERS

BACKGROUND OF THE INVENTION

This invention relates to new polymeric products and, more particularly, to polymeric derivatives of aminoethanethiols.

SUMMARY OF THE INVENTION

It is the primary object of the present invention to provide styrene polymers containing pendant aminoethanethiol moieties.

It is another object of the present invention to provide such polymers useful as complexing agents for silver ions and/or soluble silver complex in photographic products and processes.

Still other objects of this invention will in part be obvious and will in part appear hereinafter.

The invention accordingly comprises the product possessing the features, properties and the relation of elements which are exemplified in the following detailed disclosure, and the scope of the application of which will be indicated in the claims.

For a fuller understanding of the nature and objects of the invention, reference should be had to the following detailed description.

DESCRIPTION OF THE PREFERRED EMBODIMENTS

According to the present invention, new polymers are provided which comprise recurring segments of the following structure:

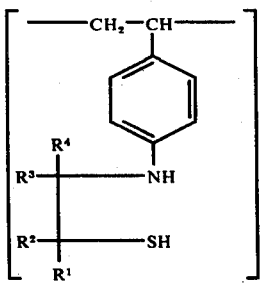

wherein $R^1$, $R^2$, $R^3$ and $R^4$ each are selected from hydrogen and lower alkyl containing 1 to 4 carbon atoms, such as, methyl, ethyl, propyl, isopropyl, s-butyl, etc. In a preferred embodiment, at least one of $R^1$, $R^2$, $R^3$ and $R^4$ is alkyl and preferably $R^1$ and $R^2$ are alkyl, and $R^3$ and $R^4$ are hydrogen or $R^1$ and $R^2$ are hydrogen and $R^3$ and $R^4$ are alkyl.

The above polymeric products are prepared by reacting the selected 2-p-vinylanilinoethanethiol monomer in its thiolate form in aqueous media in the presence of a tetra-substituted azo-bis-acetonitrile catalyst, for example, 2,2'-azo-bis-[2-methylpropionitrile]. This method of synthesizing sulfur containing compounds forms the subject matter of copending U.S. patent application Ser. No. 520,982 of Michael J. Grasshoff filed Nov. 5, 1974, now abandoned a continuation-in-part of application Ser. No. 429,928 filed Jan. 2, 1973, now abandoned.

The monomers employed in the present invention are known compounds and may be prepared by the mercaptoethylation of p-vinylaniline using conventional methods. In a preferred method of synthesizing these monomers, the p-vinylaniline and the selected episulfide, e.g., isobutylene or propylene sulfide are reacted at close to room temperature in the presence of a silver salt, such as, silver nitrate as disclosed and claimed in copending U.S. patent application Ser. No. 390,209 of Frank A. Meneghini and Roberta R. Luhowy filed Aug. 21, 1973, now U.S. Pat. No. 3,919,277 issued Nov. 11, 1975 a continuation-in-part of application Ser. No. 343,284 filed Mar. 21, 1973, now abandoned. In the mercaptoethylation of non-gaseous amines, this silver ion mediated reaction preferably is conducted in acetonitrile solution as disclosed and claimed in copending U.S. patent application Ser. No. 412,314 of Louis Locatell, Jr. and Frank A. Meneghini filed Nov. 2, 1973, now abandoned.

The following example illustrates the preparation of polymers within the scope of this invention and is not intended to limit the scope thereof.

EXAMPLE

Preparation of poly[1,1-dimethyl-2-p-vinylanilinoethanethiol]

4 gms. of 1,1-dimethyl-2-p-vinylanilinoethanethiol were dissolved in 10 mls. of water containing 1.12 gms. of potassium hydroxide and 20 mgs. of 2,2'-azo-bis-(2-methylpropionitrile) and then heated for 24 hours in a sealed tube to yield a viscous solution of the polymerized product. The mixture was poured into 200 mls. of 10% acetic acid solution, resulting in a gummy material that was dried in vacuo. This was then dissolved in 20 mls. of toluene and the solution poured into 500 mls. of ether, giving a white solid. This was filtered and dried to yield 3.2 gms. of the title compound.

The 1,1-dimethyl-2-p-vinylanilinoethanethiol employed in the above polymerization was prepared as follows:

35.7 g. (0.3 mole) of vinylaniline in 200 ml. of acetonitrile and sodium bicarbonate (0.33 mole) were added to a solution of 15.0 g. (0.3 mole) of silver nitrate in 250 ml. of acetonitrile. 26.4 g. (0.3 mole) of isobutylene sulfide in 50 ml. of acetonitrile was then slowly added. The temperature reached about 55° C. After addition was complete, the mixture was allowed to stir 1.5 hours at room temperature. The yellow solid that formed was broken up, the acetonitrile removed by filtration and the solid washed with 500 ml. of ethanol and filtered. The solid was then suspended in 500 ml. of ethanol, and $H_2S$ was bubbled into the suspension for about 2 hours. The $Ag_2S$ precipitate that formed was removed by filtration and the filtrate evaporated in vacuuo. The residue was distilled to give 1,1-dimethyl-2-p-vinylanilinoethanethiol in 35% by weight yield.

In addition to the 1,1-dimethyl-2-p-vinylanilinoethanethiol, the isomer, 2,2-dimethyl-2-p-vinylanilinoethanethiol may be recovered from the residue, if desired, and polymerized in the same manner described above to give the corresponding polymer. As discussed in aforementioned applications Ser. Nos. 390,209 and 412,314, the silver ion mediated reaction of relatively non-nucleophilic amines, like aniline, and unsymmetrical episulfides, like isobutylene sulfide, leads to a two to one mixture of 1,1-dimethyl- and 2,2-dimethyl-2-anilino-ethanethiol, respectively, which mixture of isomers can be resolved by fractional crystallization of the hydrochloride salts to give the jamor isomer. The other isomer may be recovered by chromatography of the mother liquors.

It will be appreciated that the polymers prepared according to the foregoing procedure may be acidified with, for example, hydrochloric acid to yield the thiol form and also that metal salts other than the sodium salt may be prepared including mixtures of metal salts.

As mentioned previously, the subject polymers may be employed as complexing agents for silver ion and/or soluble silver complex in photographic products and processes. For example, the subject polymers may be employed as a silver scavenger layer in integral multilayer photosensitive elements to confine the silver ion and/or soluble silver complex made available during development to the appropriate layer or layers of the film unit as described in copending U.S. patent application Ser. No. 574,296 of Ronald F. W. Cieciuch, Roberta R. Luhowy, Frank A. Meneghini and Howard G. Rogers filed concurrently herewith.

As an illustration of this utility, the following comparison was made. A Polaroid Land Type 107 image-receiving element comprising an image-receiving layer of silver precipitating nuclei carried on a support was modified by applying a layer of cellulose acetate hydrogen phthalate, as a stripping coat, and then applying a layer of aminoethanethiol polymer prepared in the above Example as a silver scavenger layer. A photosensitive element comprising a photosensitive silver halide emulsion carried on a transparent support was exposed and processed in superposed relationship with the modified image-receiving element by spreading a layer of processing composition between the superposed elements. The aqueous alkaline processing composition employed comprised the following ingredients:

| Water | 100.0 cc |
|---|---|
| Sodium hydroxide | 5.0 g. |
| Hydroxyethylcellulose | 4.0 g. |
| p-Methylaminophenol | 1.6 g. |
| 4-amino-6-methoxy-2-methylphenol | 0.5 g. |
| Sodium thiosulfate | 1.5 g. |

-continued

| Sodium sulfite | 2.0 g. |
|---|---|

After approximately 1 minute, the layer of silver precipitating nuclei and the support were separated from the remaining layers. Visual examination of the developed negative through the transparent support revealed 15 well-defined density steps, but substantially no silver density was observed in the image-receiving layer.

The above example was repeated except that the layer of polymeric aminoethanethiol was omitted. In this control experiment without the silver scavenger layer, a silver transfer image was observed in the image-receiving layer.

Since certain changes may be made in the above products and processes without departing from the scope of the invention herein involved, it is intended that all matter contained in the above description shall be interpreted as illustrative and not in a limiting sense.

What is claimed is:

1. A polymer comprising segments of the structure:

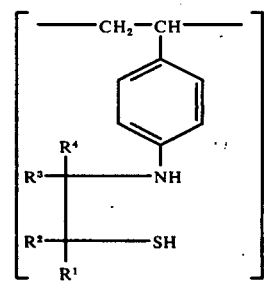

wherein $R^1$, $R^2$, $R^3$ and $R^4$ each are selected from hydrogen and lower alkyl containing 1 to 4 carbon atoms.

2. A polymer as defined in claim 1 wherein at least one of said $R^1$, $R^2$, $R^3$ and $R^4$ is lower alkyl.

3. A polymer as defined in claim 2 wherein said $R^1$ and $R^2$ are lower alkyl and said $R^3$ and $R^4$ are hydrogen.

4. A polymer as defined in claim 2 wherein said $R^1$ and $R^2$ are hydrogen and said $R^3$ and $R^4$ are lower alkyl.

5. Poly[1,1-dimethyl-2-p-vinylanilinoethanethiol].

* * * * *